(12) United States Patent
Hsu et al.

(10) Patent No.: US 12,311,795 B2
(45) Date of Patent: May 27, 2025

(54) CHARGING APPARATUS AND METHOD OF OPERATING THE SAME

(71) Applicant: DELTA ELECTRONICS, INC., Taoyuan (TW)

(72) Inventors: Jui-Yuan Hsu, Taoyuan (TW); Wei-Hsun Lai, Taoyuan (TW); Ming-Yu Jiang, Taoyuan (TW); Bo-Song Lin, Taoyuan (TW); Jung-Lien Shih, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 854 days.

(21) Appl. No.: 17/464,082

(22) Filed: Sep. 1, 2021

(65) Prior Publication Data

US 2022/0234463 A1 Jul. 28, 2022

(30) Foreign Application Priority Data

Jan. 27, 2021 (CN) .......................... 202110112138.0

(51) Int. Cl.
*B60L 53/62* (2019.01)
*B60L 55/00* (2019.01)
(Continued)

(52) U.S. Cl.
CPC .......... *B60L 53/62* (2019.02); *H02J 7/00304* (2020.01); *H02J 7/0068* (2013.01); *B60L 55/00* (2019.02); *H02J 3/322* (2020.01)

(58) Field of Classification Search
CPC ............ B60L 53/62; B60L 55/00; H02J 3/322
(Continued)

(56) References Cited

U.S. PATENT DOCUMENTS

2007/0169970 A1* 7/2007 Kydd .................... B60L 50/16
903/903
2014/0324257 A1* 10/2014 Dawson ................ B60L 3/0061
701/22
(Continued)

FOREIGN PATENT DOCUMENTS

CN 103248068 A 8/2013
CN 108448699 A 8/2018
(Continued)

OTHER PUBLICATIONS

Dawson, WO Patent Document No. WO-2013121472-A2, published Jan. 16, 2014, 3 pages including abstract. (Year: 2014).*
(Continued)

*Primary Examiner* — Phallaka Kik
(74) *Attorney, Agent, or Firm* — Muncy, Geissler, Olds & Lowe, P.C.

(57) ABSTRACT

A charging apparatus for use with an electric vehicle includes a power transmission path, a switch, a first controller, a communication unit, and a second controller. The switch is disposed on the power transmission path. The communication unit is coupled to a second connection port. The first controller is coupled to the power transmission path, the switch, the second controller, and the communication unit. When the second controller receives a first request from a power management system and correspondingly notifies the first controller, the first controller switches from a first signal to a second signal to communicate with the electric vehicle and turns off the switch, and when the first controller receives a first EV notification provided from the electric vehicle, the controller turns on the switch.

13 Claims, 7 Drawing Sheets

(51) Int. Cl.
*H02J 3/00* (2006.01)
*H02J 7/00* (2006.01)
*H02J 3/32* (2006.01)

(58) Field of Classification Search
USPC ....... 320/137, 104, 109, 108, 114, 115, 134, 320/136, 161
See application file for complete search history.

(56) References Cited

U.S. PATENT DOCUMENTS

| | | | |
|---|---|---|---|
| 2014/0327408 | A1 | 11/2014 | Ishii et al. |
| 2016/0049794 | A1 | 2/2016 | Liu et al. |
| 2020/0274386 | A1* | 8/2020 | Kirleis ................. H02J 7/0063 |
| 2020/0412136 | A1* | 12/2020 | Kristjansson ....... H02J 7/00714 |
| 2021/0376623 | A1* | 12/2021 | Zhang .................. H02J 7/0047 |
| 2022/0029431 | A1* | 1/2022 | McLean ................ B60L 50/66 |
| 2022/0029439 | A1* | 1/2022 | Justin .................... H02J 7/0071 |
| 2022/0085595 | A1* | 3/2022 | Song .................... H02H 1/0007 |

FOREIGN PATENT DOCUMENTS

| | | | | |
|---|---|---|---|---|
| CN | 108899977 | A | 11/2018 | |
| CN | 112248842 | A | 1/2021 | |
| WO | WO-2014011606 | A2 * | 1/2014 | ............... B60L 1/02 |

OTHER PUBLICATIONS

European search report dated Feb. 25, 2022 of European patent application No. EP21194553.0, 9 pages.
Taiwan office action dated Dec. 27, 2021 of Taiwan patent application No. 110102934, 7 pages.

\* cited by examiner

CHARGING APPARATUS AND METHOD OF OPERATING THE SAME

BACKGROUND

Technical Field

The present disclosure relates to a charging apparatus, and more particularly to a bidirectional AC charging apparatus for use with electric vehicles and a method of operating the same.

Description of Related Art

The statements in this section merely provide background information related to the present disclosure and do not necessarily constitute prior art.

In recent years, due to the rising awareness of environmental protection, government agencies are actively promoting energy-saving and carbon-reducing policies, and therefore the electric vehicle (EV) industry, which can significantly reduce air pollution, has also developed vigorously. With the increasing popularity of electric vehicle applications, the charging technology of electric vehicles is getting more and more attention. FIG. 1 illustrates a block diagram of a conventional charging apparatus for use with electric vehicles. The conventional charging apparatus 1' is coupled to an AC power source 2, for example an electrical grid provided by a power company, and is physically coupled to the electric vehicle 3 through a charging gun to charge the electric vehicle 3. The conventional charging apparatus 1' usually only provides power P1 of the AC power source 2 to charge the electric vehicle 3 in a single current flow direction. During the charging process, a controller 16' uses a communication unit 14 to communicate with the electric vehicle 3, and controls a switch 20 to be turned on so as to establish a power transmission path for the charging current to flow.

However, due to the growing demand for electricity year by year, power companies are facing pressures to balance the supply and demand of the power grid. Along with the diversification of energy applications such as smart grid, renewable energy, and distributed enemy resources, the supply and demand of power electricity is no longer limited to the single-direction from power generation side to power consumption side. Therefore, power companies are trying to dispatch power more dynamically and flexibly based on the actual power demand, electricity cost, and the cost-effectiveness of power generation. Accordingly, the conventional single-direction EV charging method, from the AC power source 2 to the electric vehicle 3, can no longer meet the above-mentioned energy applications and power dispatch requirements.

Therefore, the present disclosure provides a charging apparatus for use with an electric vehicle and a method of operating the same as a bidirectional power supply solution between the AC power source and the AC charging type electric vehicles according to the actual power dispatch requirements of the power system.

SUMMARY

In order to solve the above-mentioned problems, the charging apparatus is coupled to an AC power source and an electric vehicle. The charging apparatus includes a power transmission path, a switch, a first controller, a second controller, and a communication unit. One end of the power transmission path is coupled to the AC power source through a first connection port, and the other end of the power transmission path is coupled to the electric vehicle through a second connection port. The switch is disposed on the power transmission path. The first controller is coupled to the power transmission path and the switch. The second controller is coupled to the first controller and the AC power source. The communication unit is coupled to the first controller and the second connection port. When the second controller receives a first request from the AC power source, the second controller provides a first notification to the first controller, and the first controller communicates with the electric vehicle through the communication unit according to the first notification and controls the switch to be turned off. When the first controller receives a first EV notification from the electric vehicle, the first controller controls the switch to be turned on.

In order to solve the above-mentioned problems, the method of operating a charging apparatus includes steps of: (a) receiving, by a second controller, a first request from a power management system, (b) notifying, by the second controller, a first controller when the second controller receives the first request so that the first controller correspondingly uses a second signal to communicate with an electric vehicle through a communication unit, and controls a power transmission path to be not conducting, and (c) controlling, by the first controller, the power transmission path to be conducting when the first controller receives a first EV notification from the electric vehicle.

The main purpose and effect of the present invention are: the first controller determines whether the second controller receives the first request from the AC power source and whether the first controller receives the first EV notification to automatically control the switch to be turned on or turned off, so that the charging apparatus of the present invention can provide power bidirectionally based on the requests of the AC power source and the states of the electric vehicle.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, reference made to the accompanying drawing as follows.

DETAILED DESCRIPTION

Figure 1:
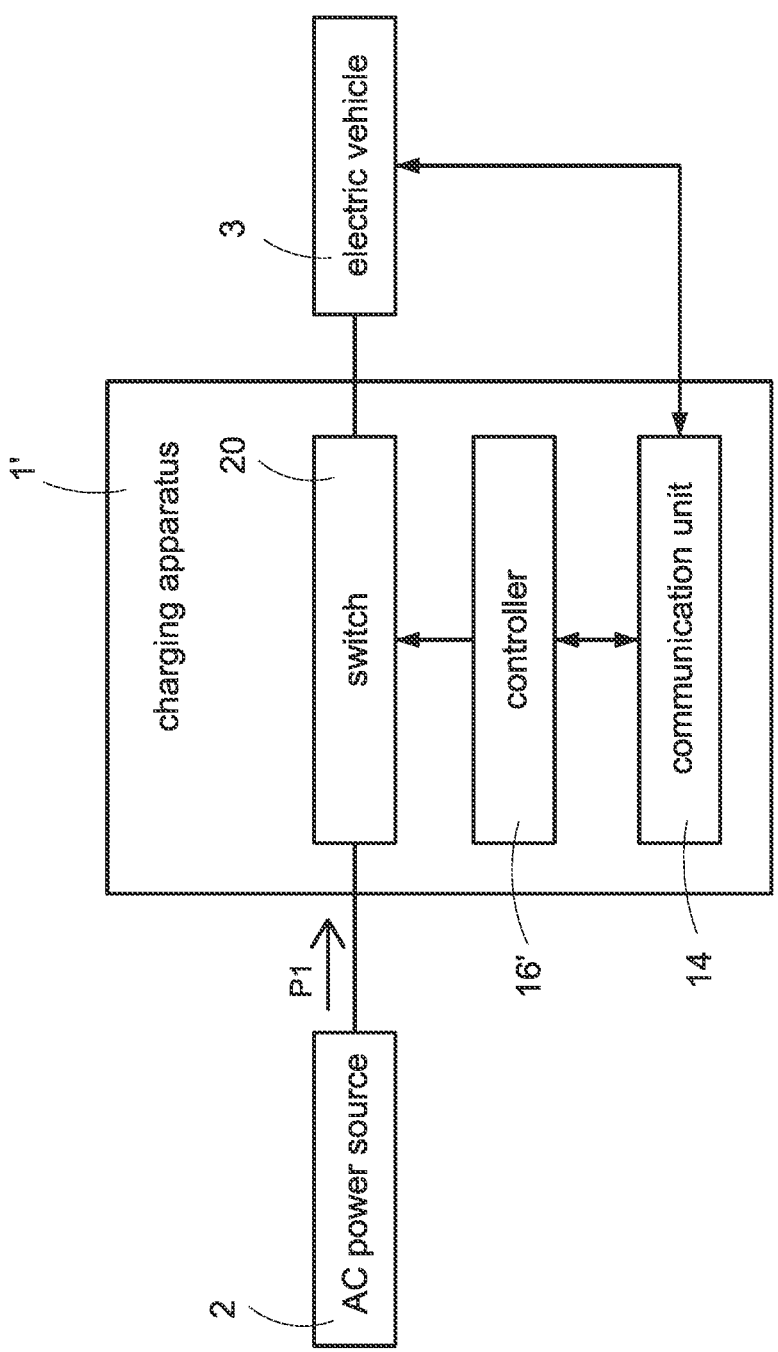
FIG. 1 is a block diagram of an exemplary conventional charging apparatus.

Reference will now be made to the drawing figures to describe the present disclosure in detail. It will be understood that the drawing figures and exemplified embodiments of present disclosure are not limited to the details thereof.

Figure 2:
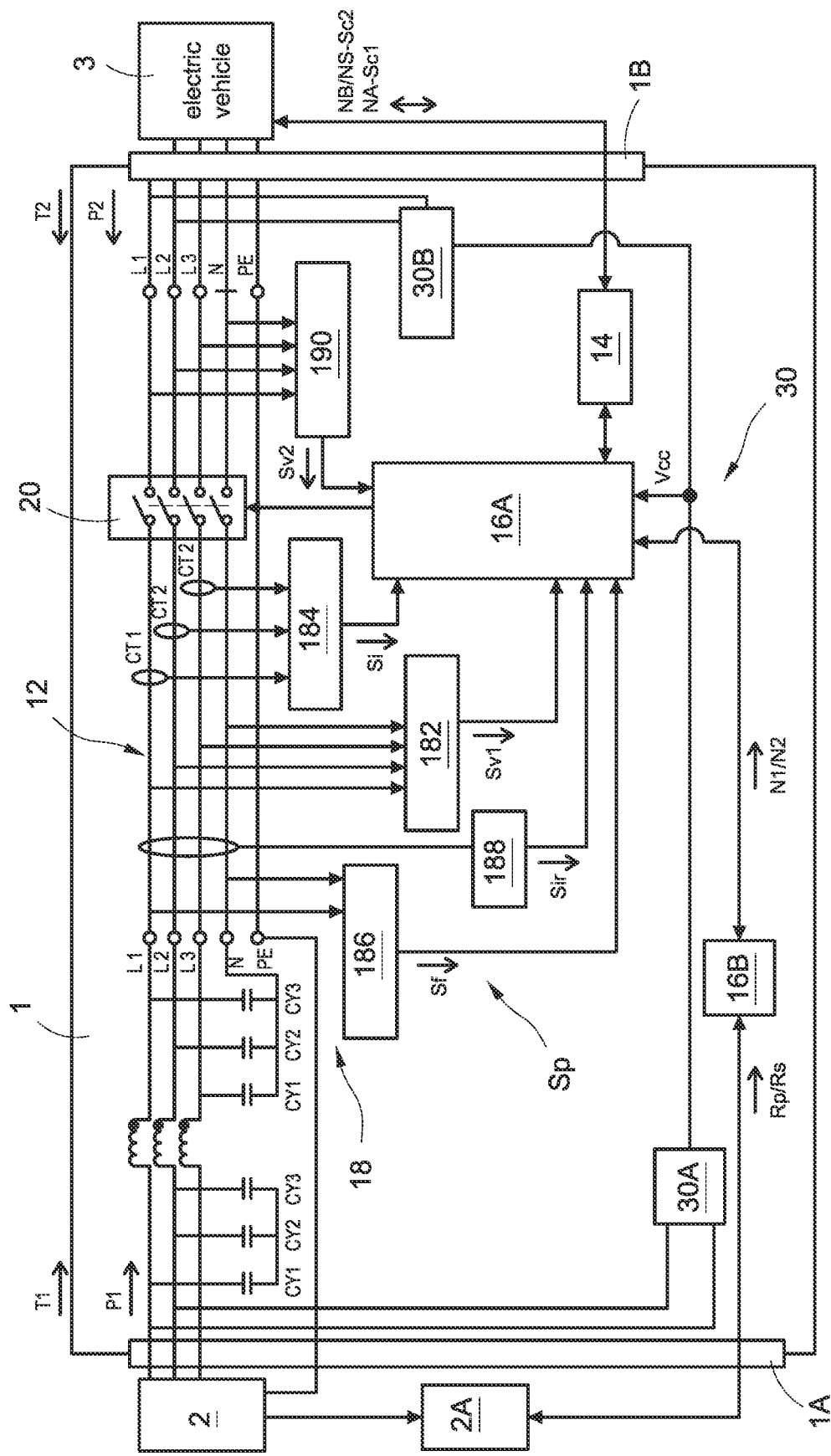
FIG. 2 is a circuit block diagram of an exemplary charging apparatus according to the present disclosure.

Please refer to FIG. 2, which shows a circuit block diagram of an exemplary charging apparatus according to the present disclosure. The charging apparatus 1 is coupled to an AC power source 2, for example an electrical grid provided by a power company, and an electric vehicle 3 is coupled to the charging apparatus 1. The charging apparatus 1 provides a power transmission path for charging the electric vehicle 3 from the AC power source 2, or a power transmission path for feeding power to the AC power source 2 from the electric vehicle 3 according to demands of the electric vehicle 3 and the AC power source 2. The electric vehicle 3 may be a vehicle propelled by electricity, such as an electric car or an electric scooter. The charging apparatus 1 includes a power transmission path 12, a switch 20, a communication unit 14, a first controller 16A, and a second controller 16B. The switch 20 is disposed on the power transmission path 12, and is used to be turned on to establish the power transmission path 12 or turned off to interrupt the power transmission path 12. One end of the power transmission path 12 is coupled to the AC power source 2 through a power interface of a first connection port 1A, and the other end of the power transmission path 12 is coupled to the electric vehicle 3 through a power interlace of the second connection port 1B. Therefore, the power transmission path 12 can provide charging power transmission in a direction T1 (from the first connection port 1A to the second connection port 1B) and provide feeding power transmission in a direction T2 (from the second connection port 1B to the first connection port 1A).

The communication unit 14 is coupled to the first controller 16A, and is coupled to the electric vehicle 3 through a communication interface of the second connection port 1B. The communication unit 14 is used as a communication channel for information handshaking between the first controller 16A and the electric vehicle 3 so as to exchange the information of each other's current status and power demand. After the electric vehicle 3 is physically coupled to the charging apparatus 1, the first controller 16A and the electric vehicle 3 exchange the information of each other's current status and power demand through the communication unit 14 so that the first controller 16A controls the charging apparatus 1, such as to provide a charging path or a power feeding path, according to the results of the handshaking communication with the electric vehicle 3. The second controller 16B is connected to an AC power source management system 2A and the first controller 16A, and the second controller 16B may be a grid code controller. The second controller 16B communicates with the AC power source management system 2A to acquire the related information of the AC power source 2, such as the voltage, the current, the frequency of the AC power source 2 and the power demand of the AC power source 2. When the AC power source management system 2A provides a first request RP, such as a power demand request, or a second request RS, such as a demand termination request, to the second controller 16B according to the peak load demand, supply and demand balancing, or power quality management needs of the AC power source 2, the second controller 16B correspondingly provides a first notification to the first controller 16A according to the first request RP, and provides a second notification to the first controller 16A according to the second request RS. The first controller 16A thus determines to turn on or turn off the switch 20 according to the received notifications.

Specifically, whether the power (current) flows from the AC power source 2 to the electric vehicle 3 or the power flows from the electric vehicle 3 to the AC power source 2 is controlled by turning on or turning off the switch 20 based on the power demand of the AC power source 2 and/or the power demand of the electric vehicle 3, and such system behaviors are described as operation modes as follows. In one embodiment of the present disclosure, the operation modes include a charging mode and a feeding mode. In the charging mode, the power P1 of the AC power source power 2 is transmitted in the direction T1, from the first connection port 1A to the second connection port 1B, through the power transmission path 12 when the switch 20 is turned on. In the feeding mode, feed power P2 is transmitted in the direction T2, from the second connection port 1B to the first connection port 1A, through the power transmission path 12 when the switch 20 is turned on. Moreover, the operation modes further include a standby mode. In the standby mode, the power transmission path 12 is interrupted by turning off the switch 20 to cause no power transmission. In addition to the above-mentioned notification types, the first controller 16A also selects the feeding mode, the charging mode, or the standby mode according to the results of the handshaking communication with the electric vehicle 3.

After the electric vehicle 3 is physically coupled to the second connection port 1B, the first controller 16A communicates with the electric vehicle 3 with a first signal Sc1 through the communication unit 14. According to the standard of IEC 61851, which is an international standard for electric vehicle conductive charging systems, the first signal Sc1 may be a PWM (pulse width modulation) signal with frequency of approximately 1 kHz. In addition to the default communication method of transmitting the first signal Sc1 between the first controller 16A and the electric vehicle 3, if the second controller 16B receives the first request RP from the AC power source management system 2A and provides the first notification to the first controller 16A, the communication method between the first controller 16A and the electric vehicle 3 will be changed to transmitting a second signal Sc2 different from the first signal Sc1 in, such as but not limited to a signal with different pulse, packet, and/or frequency from the first signal Sc1. The first controller 16A exchanges the related information of the first request RP (such as but not limited to the current power demand of the AC power source, the active power of the AC power source that needs to be compensation, or the frequency regulation demand) with the electric vehicle 3 through the second signal Sc2. After the information exchange of the first request RP between the first controller 16A and the electric vehicle 3, the first controller 16A sets the operation mode to the standby mode to control the switch 20 to be turned off, thereby terminating any power transmission behavior. During the communication using the second signal Sc2, if the electric vehicle 3 determines that its own state and the state of its battery are not abnormal and the energy is sufficient to meet the first request RP, the electric vehicle 3 provides a first EV notification NB, which may instruct that the electric vehicle 3 allows to feed the stored electricity thereof to the AC power source 2, to the first controller 16A.

The first EV notification NB is provided to the first controller 16A through the communication interface of the second connection port 1B and the communication unit 14 so that the first controller 16A determines that the electric vehicle 3 allows to feed the stored electricity thereof back to the AC power source 2, and correspondingly set the operation mode to the feeding mode. Since the first controller 16A communicates with the electric vehicle 3 using the PWM signal with frequency of 1 kHz in the charging mode, it's easier to implement signals with different frequencies from the first signal Sc1 in the feeding mode. For example, in one embodiment of the present disclosure, the second signal Sc2 with a higher frequency than the first signal Sc1 is preferred. In order to be significantly distinguishable from the 1 kHz signal and easy to implement, the second signal Sc2 is preferably a 10-kHz signal. On the contrary, after the electric vehicle 3 is physically coupled to second connection port 1B, if the first controller 16A does not receive the first request RP from the AC power source management system 2A, it means that the feeding mode is not required. If the electric vehicle 3 has a charging demand and provides a ready-to-be-charged notification NA to the first controller 16A, the first controller 16A determines that the electric vehicle 3 is ready to receive energy, and sets the operation mode to the charging mode.

Figure 3:
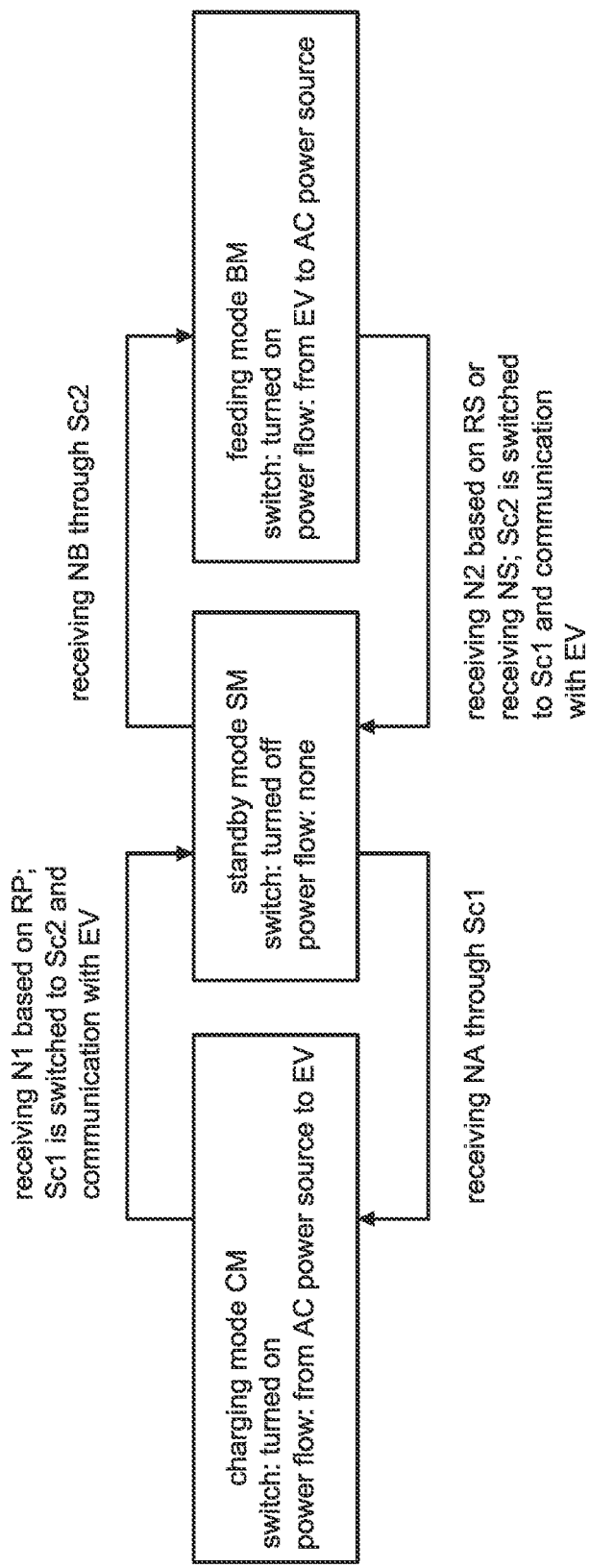
FIG. 3 is a block diagram indicating how the operation modes of the charging apparatus are switched according to the present disclosure.

Please refer to FIG. 3, which shows a block diagram indicating how the operation modes of the charging apparatus are switched according to the present disclosure, and also refer to FIG. 2. In one embodiment, a standby mode SM is provided between a charging mode CM and a feeding mode BM. In the standby mode SM, the first controller 16A controls the switch 20 to be turned off so that the power transmission path 12 is interrupted so as to prevent improper current flowing during the operation mode switching, which may cause damage to the charging apparatus 1, the electric vehicle 3, or the operator. For example, in the charging mode CM, the communication between the first controller 16A and the electric vehicle 3 is performed with the first signal Sc1. If the second controller 16B receives the first request RP from the AC power source management system 2A, the second controller 16B provides a first notification N1 to the first controller 16A. The first controller 16A correspondingly stops using the first signal Sc1 to communicate with the electric vehicle 3, and instead changes to use the second signal Sc2 to communicate with the electric vehicle 3 to exchange the related information of the first request RP with the electric vehicle 3. After the information exchange of the first request RP between the first controller 16A and the electric vehicle 3, the first controller 16A sets the operation mode to the standby mode SM and controls the switch 20 to be turned off so that the power transmission path 12 is interrupted (not conducting). When the first controller 16A confirms that the power transmission path 12 is interrupted and the electric vehicle 3 provides the first EV notification NB (in the format of the second signal Sc2) to the first controller 16A, the first controller 16A sets/changes the operation mode to the feeding mode BM to control the switch 20 to be turned on so that the feed power P2 of the electric vehicle 3 is transmitted from the second connection port 1B to the first connection port 1A through the power transmission path 12 to be supplied to the AC power source 2.

On the contrary, in the feeding mode BM, the communication between the first controller 16A and the electric vehicle 3 is performed with the second signal Sc2. If the second controller 16B receives the second request RS, such as a request to terminate the power feeding demand, from the AC power source management system 2A (and then the second controller 16B provides a second notification N2 to the first controller 16A), or if the first controller 16A receives a second EV notification NS (in the format of the second signal Sc2) from the electric vehicle 3 due to internal events of the electric vehicle 3 (such as but not limited to electric vehicle system failure, battery failure, or insufficient battery power), the first controller 16A correspondingly stops using the second signal Sc2 to communicate with the electric vehicle 3, and sets the operation mode to the standby mode SM and controls the switch 20 to be turned off so that the power transmission path 12 is interrupted (not conducting). After the first controller 16A confirms that the power transmission path 12 is interrupted, the first controller 16A changes to use the first signal Sc1 to communicate with the electric vehicle 3. When the first controller 16A confirms that the electric vehicle 3 provides the ready-to-be-charged notification NA (in the format of the first signal Sc1) to the first controller 16A, the first controller 16A sets/changes the operation mode to the charging mode CM to control the switch 20 to be turned on so that the power P1 of the AC power source 2 is transmitted from the first connection port 1A to the second connection port 1B through the power transmission path 12 to be supplied to the electric vehicle 3.

Therefore, the communication between the first controller 16A and the electric vehicle 3 is performed with different types of signals according to different requests from the AC power source management system 2A, so that the first controller 16A can automatically switch the operation mode between the feeding mode BM, the charging mode CM, or the standby mode SM, therefore solving the issue of the conventional technology in FIG. 1 that it only provides single-direction charging. Accordingly, the charging apparatus of the present disclosure can achieve bidirectional power supply according to the power demand of the AC power source 2 or the electric vehicle 3.

Please refer to FIG. 2 again, the charging apparatus 1 further includes a detection circuit 18. The detection circuit 18 is coupled to the power transmission path 12 and the first controller 16A. The detection circuit 18 detects the AC power of the power transmission path 12 to generate a power information signal Sp. The first controller 16A determines to control the switch 20 to be turned on or turned off so that the power transmission path 12 is conducting or not conducting according to the power information signal Sp. Specifically, the detection circuit 18 includes a plurality of detection units, such as a first voltage detection unit 182, a current detection unit 184, a frequency detection unit 186, a residual current detection unit 188, and a second voltage detection unit 190 for detecting power parameters of the power transmission path 12. The detection units 182-190 are respectively coupled to the first controller 16A.

The first voltage detection unit 182 detects a voltage of a first path between the first connection port 1A and the switch 20, and generates a first voltage signal Sv1. The second voltage detection unit 190 detects a voltage of a second path between the switch 20 and the second connection port 1B, and generates a second voltage signal Sv2. When the switch 20 is not turned on, the first voltage signal Sv1 is corresponding to a voltage at the AC power source side and the second voltage signal Sv2 is corresponding to a voltage at the electric vehicle side. The current detection unit 184 detects a current of the power transmission path 12, and generates a current signal Si. The frequency detection unit 186 detects an AC frequency of a voltage and that of a current of the power transmission path 12, and generates a frequency signal Sf. The residual current detection unit 188 detects a residual current of the power transmission path 12, and generates a residual current signal Sir. The power information signal Sp includes at least the first voltage signal Sv1, the second voltage signal Sv2, the current signal Si, the frequency signal Sf, and the residual current signal Sir. The first controller 16A determines to turn on or turn off the switch 20 so that the power transmission path 12 is conducting or not conducting according to the above-mentioned signals. The first controller 16A can determine whether an over voltage (OV) event, an under voltage (UV) event, an over current (OC) event, an over frequency (OF) event, or an under frequency (UF) event of the power transmission path 12 occurs according to the first voltage signal Sv1, the second voltage signal Sv2, the current signal Si, and the frequency signal Sf, and determine whether a current leakage event of the power transmission path 12 (between a ground end N) occurs according to the residual current signal Sir. If the above-mentioned abnormalities do not occur, the first controller 16A controls the switch 20 to be turned on so that the power transmission path 12 is conducting. On the contrary, when any one of the abnormalities occurs, the first controller 16A controls the switch 20 to be turned off so that the power transmission path 12 is not conducting. In particular, the switch 20 may be a switch component allowing bidirectional current flow when turned on, a switch with two transistors connected in series, or a relay.

Please refer to FIG. 2 again, the charging apparatus 1 further includes an auxiliary power circuit 30. The auxiliary power circuit 30 is coupled to internal loads inside the charging apparatus 1, such as but not limited to the first controller 16A, the communication unit 14, the switch 20, and other peripheral circuits or electronic components that require auxiliary power to operate. The auxiliary power circuit 30 includes a first conversion circuit 30A and a second conversion circuit 30B. The first conversion circuit 30A and the second conversion circuit 30B are suitable for a three-phase power system or a single-phase power system. In one embodiment, the first conversion circuit 30A is coupled to power lines of two phases of the power transmission path 12, and the coupling position thereof is preferably closer to the first connection port 1A. The first conversion circuit 30A may by a conventional AC-to-DC conversion circuit, for example but not limited to a flyback conversion circuit, a forward conversion circuit, and so on. The first conversion circuit 30A converts the voltage of the power transmission path 12 into an auxiliary power voltage Vcc for the internal loads, and the auxiliary power voltage Vcc may be +15 volts, +12 volts, +5 volts, and/or +3 volts. The second conversion circuit 30B is coupled to power lines of two phases of the power transmission path 12, and the coupling position thereof is preferably closer to the second connection port 1B. The second conversion circuit 30B may by a conventional AC-to-DC conversion circuit for converting the voltage of the power transmission path 12 into the auxiliary power voltage Vcc for the internal loads. The output ends of the second conversion circuit 30B are connected with the output ends of the first conversion circuit 30A in parallel.

One feature of the charging apparatus 1 is that the auxiliary power voltage Vcc can be provided/supplied by the first conversion circuit 30A and/or by the second conversion circuit 30B in different operation modes. In the charging mode CM, since the switch 20 is turned on, the voltage of the power P1 of AC power source 2 may be converted into the auxiliary power voltage Vcc by the first conversion circuit 30A or the second conversion circuit 30B so that the first controller 16A can work and stably provide the control of charging mode CM for the charging apparatus 1. Similarly, in the feeding mode BM, since the switch 20 is turned on, the voltage of the feed power P2 may be converted into the auxiliary power voltage Vcc by the first conversion circuit 30A or the second conversion circuit 30B. However, in the standby mode SM, since the switch 20 is turned off, only the AC power source 2 or the electric vehicle 3 can provide power. Therefore, whether the power is provided by the AC power source 2 or the electric vehicle 3, the auxiliary power circuit 30 can convert the power into the auxiliary power voltage Vcc. Assuming that if only the first conversion circuit 30A exists in the charging apparatus 1, in a situation that the first controller 16A is operating in the charging mode CM but the AC power source 2 happens to fail, or a situation that the first controller 16A is operating in the standby mode SM, which means the switch 20 is not turned on yet, but the AC power source 2 fails, the first conversion circuit 30A will not be able to supply power to the first controller 16A due to the loss of the AC power source 2, so that the charging apparatus 1 will fail, and vice versa. Therefore, the second conversion circuit 30B is additionally used to ensure that once one of the AC power source 2 and the electric vehicle 3 fails, the first controller 16A can be successfully supplied the auxiliary power Vcc by the other power source.

Figure 4A:
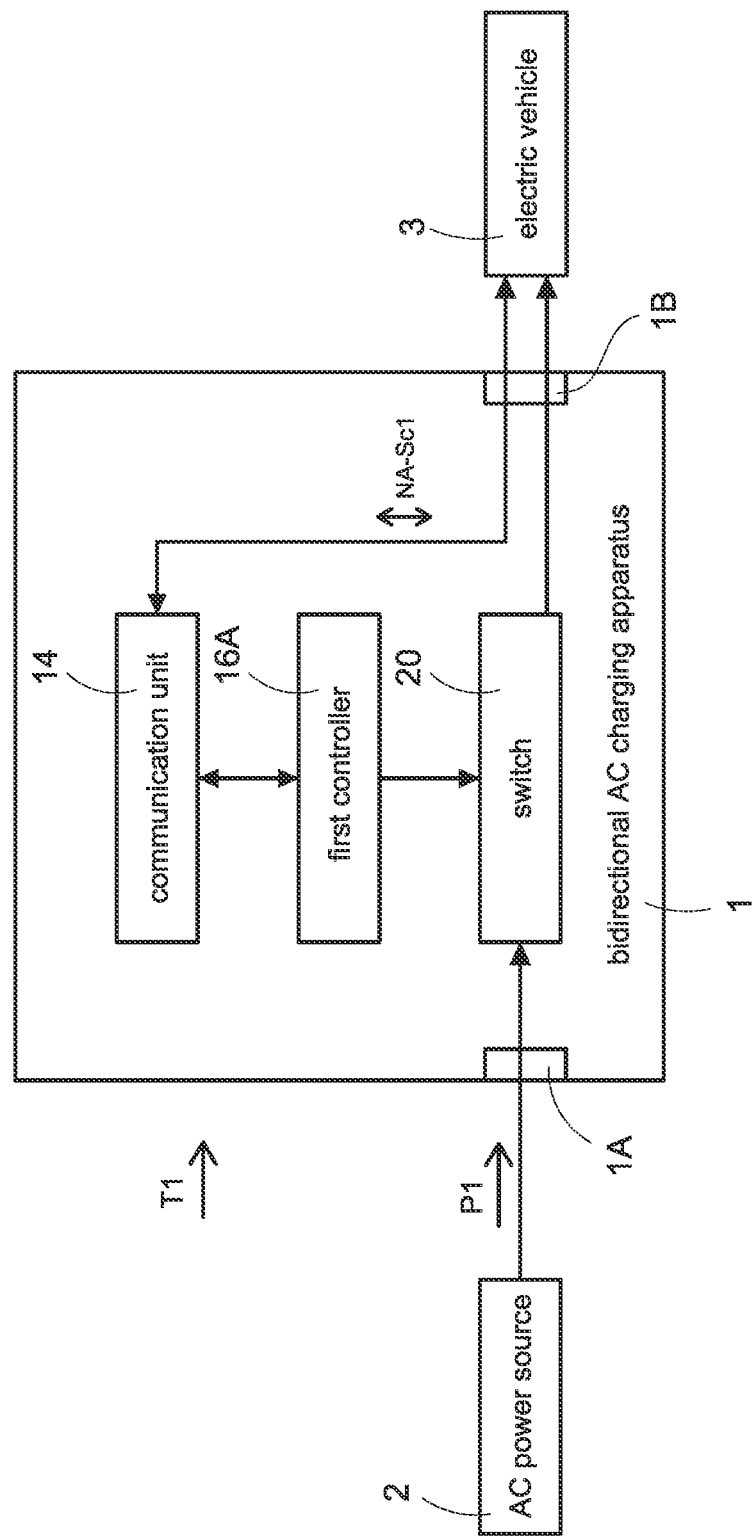
FIG. 4A is a block diagram of an exemplary operation of the charging apparatus in a charging mode according to the present disclosure.
Figure 4B:
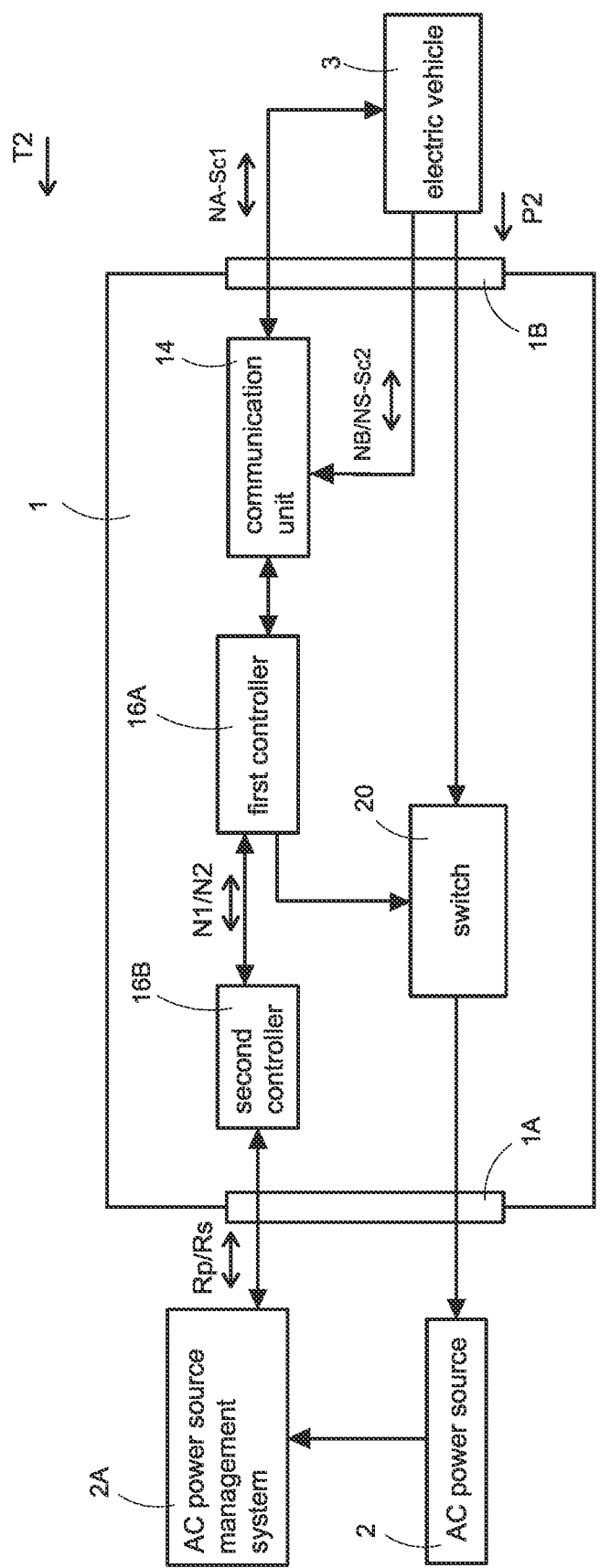
FIG. 4B is a block diagram of an exemplary operation of the charging apparatus in a feeding mode according to the present disclosure.

Please refer to FIG. 4A and FIG. 4B, which respectively show block diagrams of the controller operating in the charging mode and in the feeding mode according to the present disclosure, and also refer to FIG. 2 to FIG. 3. In FIG. 4A, after the electric vehicle 3 is physically coupled to the second connection port 1B, the first controller 16A communicates with the electric vehicle 3 through the communication unit 14 using the first signal Sc1. When the first controller 16A receives the ready-to-be-charged notification NA provided by the electric vehicle 3 according to the results of the handshaking communication, the first controller 16A operates in the charging mode CM. Afterward, the first controller 16A controls the switch 20 of the charging apparatus 1 to be turned on so that the power P1 provided by the AC power source 2 is transmitted in the direction T1 to the electric vehicle 3 through the first connection port 1A, the switch 20, and the second connection port 1B.

In FIG. 4B, after the electric vehicle 3 is physically coupled to the second connection port 1B, the first controller 16A communicates with the electric vehicle 3 through the communication unit 14 using the first signal Sc1. The second controller 16B is coupled to the AC power source management system 2A, and acquires the related information of the AC power source 2, such as but not limited to voltage, current, frequency, and power demand, from the AC power source management system 2A. When the second controller 16B receives the first request RP provided by the AC power source management system 2A, and provides the first notification N1 to the first controller 16A according to the first request RP, the first controller 16A correspondingly stops using the first signal Sc1 to communicate with the electric vehicle 3, and instead changes to use the second signal Sc2 to communicate with the electric vehicle 3 so as to exchange the related information of the first request RP with the electric vehicle 3. After the information exchange of the first request RP between the first controller 16A and the electric vehicle 3, the first controller 16A sets the operation mode to the standby mode SM to control the switch 20 to be turned off so that the power transmission path 12 is not conducting. If the first controller 16A receives the first EV notification NB provided by the electric vehicle 3 through the communication unit 14, the first controller 16A sets/changes the operation mode to the feeding mode BM. In particular, the first EV notification NB and the second EV notification NS are used in the format of the second signal Sc2. Afterward, the first controller 16A determines the optimal timing of turning on the switch 20 according to the current AC power source information provided by the second controller 16B. Alternatively, the first controller 16A provides the current AC power source information to the electric vehicle 3, and the electric vehicle 3 determines the voltage and phase of the feed power P2 according to the AC power source information. After the electric vehicle 3 outputs the feed power P2 and notifies the first controller 16A, the first controller 16A controls the switch 20 to be turned on so that the feed power P2 provided by the electric vehicle 3 is transmitted in the direction T2 to the AC power source 2 through the second connection port 1B, the switch 20, and the first connection port 1A. If the first signal Sc1 and the second signal Sc2 are different types of signals, different signal transmission lines can be used to respectively transmit these two signals, as shown in FIG. 4B. If the first signal Sc1 and the second signal Sc2 are the same type of signals, for example both are PWM signals with difference only in frequency, the same signal transmission line can be used to transmit the two signals. In particular, the use of the transmission line(s) may be adjusted according to actual needs.

Figure 5A:
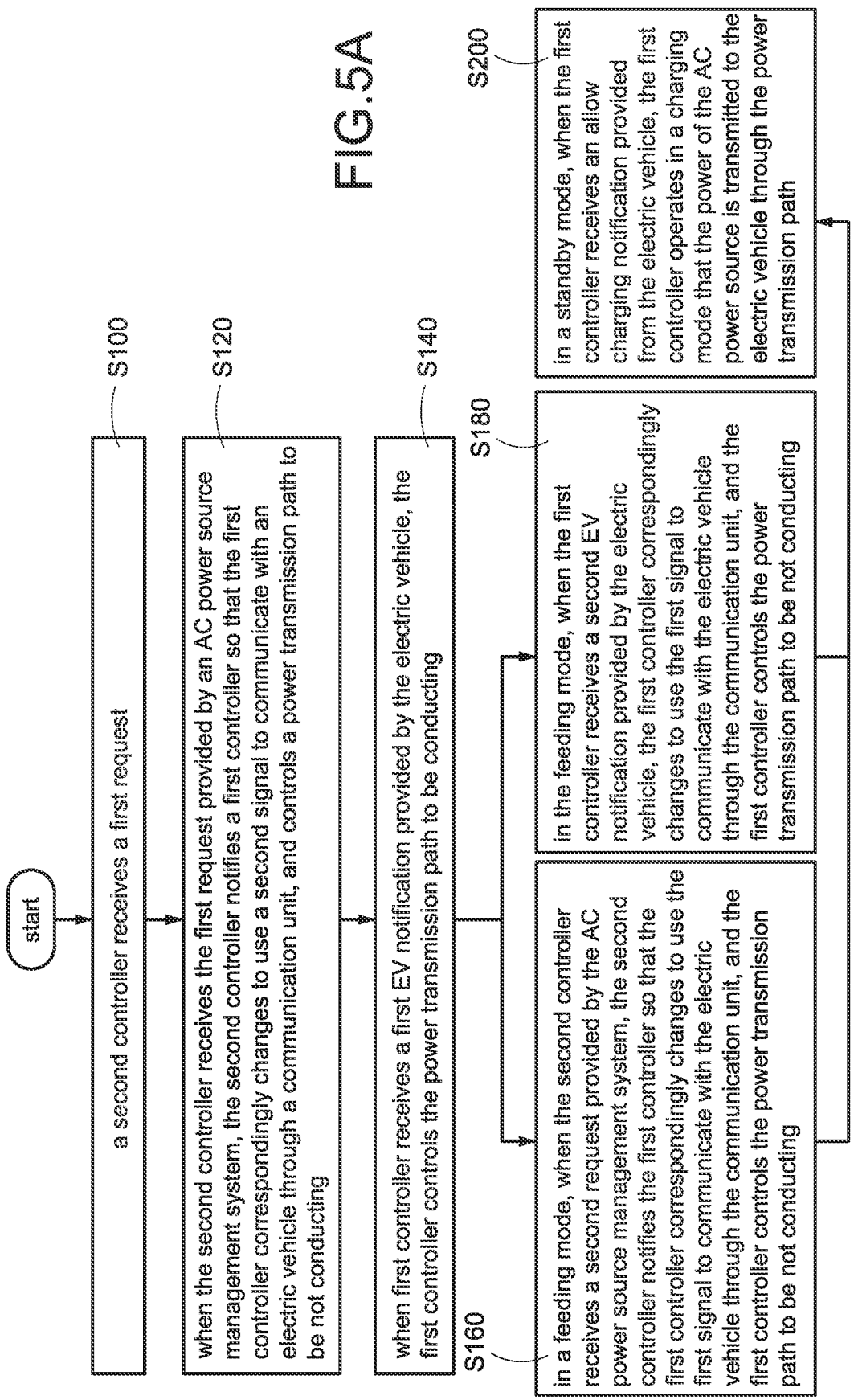
FIG. 5A is a flowchart of an exemplary method of setting operation modes of the charging apparatus according to the present disclosure.

Please refer to FIG. 5A, which shows a flowchart of an exemplary method of setting operation modes of the charging apparatus according to the present disclosure, and also refer to FIG. 2 to FIG. 4B. The method of operating the charging apparatus 1 includes the following steps. First, a second controller receives a first request (S100). The second controller 16B is connected to an AC power source management system 2A and a first controller 16A. The second controller 16B communicates with the AC power source management system 2A to acquire the related information of the AC power source 2, such as but not limited to the status and the power demand of the AC power source 2. Afterward, when the second controller receives the first request, for example a power demand request, provided by the AC power source management system, the second controller notifies the first controller so that the first controller correspondingly changes to use a second signal to communicate with the electric vehicle through a communication unit, and controls the power transmission path to be not conducting (S120). When the AC power source management system 2A provides the first request RP to the second controller 16B according to the demand of current supply and demand balance of the AC power source 2, the second controller 16B provides a first notification to the first controller 16A according to the first request RP. After the first controller 16A receives the first notification, the first controller 16A changes to use a second signal Sc2 different from a first signal Sc1, such as but not limited to a signal with different pulse, package, and/or frequency from the first signal Sc1, to communicate with electric vehicle 3. After the information exchange of the first request RP between the first controller 16A and the electric vehicle 3, the first controller 16A controls the switch 20 of the power transmission path 12 to be turned off so that the power transmission path 12 is not conducting.

Afterward, when first controller receives a first EV notification provided by the electric vehicle, the first controller controls the power transmission path to be conducting (S140). During the communication between the first controller 16A and the electric vehicle 3 using the second signal Sc2, if the electric vehicle 3 determines that its own state and the state of its battery are not abnormal and the energy stored in its battery is sufficient to meet the first request, the electric vehicle 3 provides a first EV notification NB to the first controller 16A to instruct that the electric vehicle 3 allows to feed the stored electricity thereof to the AC power source 2. The first EV notification NB is provided to the first controller 16A through a communication interface of the second connection port 1B and the communication unit 14 so that the first controller 16A determines that the electric vehicle 3 allows to feed the stored electricity thereof back to the AC power source 2, and the operation mode is set to a feeding mode. In the feeding mode, the switch 20 of the power transmission path 12 is turned on so that the power transmission path 20 is conducting to provide a path to transmit power from the electric vehicle 3 back to the AC power source 2.

Afterward, in the feeding mode, when the second controller receives a second request provided by the AC power source management system, the second controller notifies the first controller so that the first controller correspondingly changes to use the first signal to communicate with the electric vehicle through the communication unit, and the first controller controls the power transmission path to be not conducting (S160). Alternatively, in the feeding mode, when the first controller receives a second EV notification provided by the electric vehicle, the first controller correspondingly changes to use the first signal to communicate with the electric vehicle through the communication unit, and the first controller controls the power transmission path to be not conducting (S180). In the step (S140), in the feeding mode BM, the communication between the first controller 16A and the electric vehicle 3 is performed with the second signal Sc2. If the second controller 16B receives the second request RS, such as a demand termination request, provided by the AC power source management system 2A, or the first controller 16A receives the second EV notification NS provided by the electric vehicle 3 instructing that the electric vehicle 3 wants to stop feeding power, the first controller 16A changes from using the second signal Sc2 to the first signal Sc1 to communicate with the electric vehicle 3 and enters the standby mode SM, and controls the switch 20 of the power transmission path 12 to be turned off so that the power transmission path 12 is not conducting.

Finally, in the standby mode, when the first controller receives a allow charging notification provided from the electric vehicle, the first controller operates in a charging mode that the power of the AC power source is transmitted to the electric vehicle through the power transmission path (S200). After the step (S160) and the step (S180), when the first controller 16A enters the standby mode and confirms that the power transmission path 12 is not conducting, the first controller 16A continuously communicates with the electric vehicle 3 through the first signal Sc1. After the electric vehicle 3 provides the ready-to-be-charged notification NA, the first controller 16A sets/changes the operation mode to the charging mode CM to control the switch 20 to be turned on so that the power P1 of the AC power source 2 is transmitted from the first connection port 1A to the second connection port 1B through the power transmission path 12 to be supplied to the electric vehicle 3.

Figure 5B:
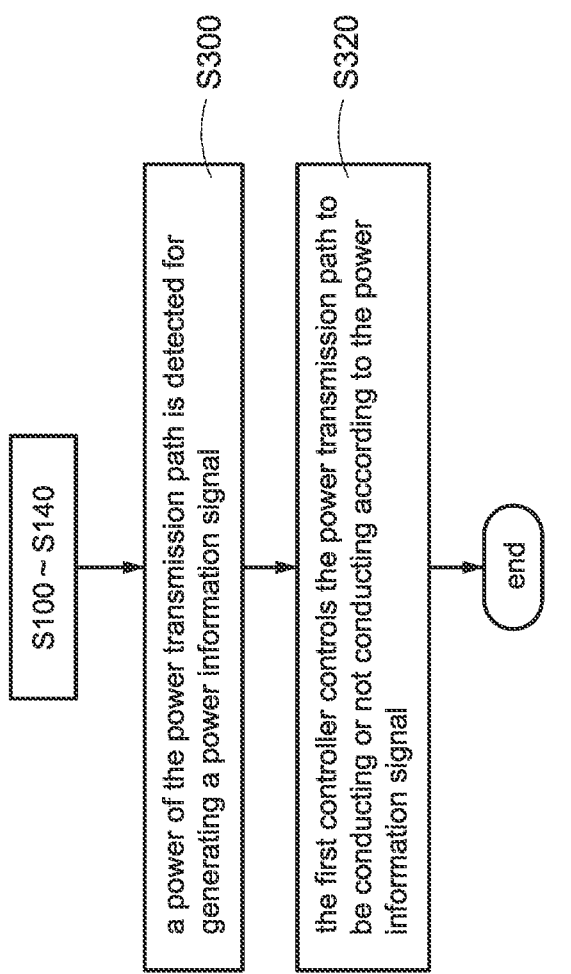
FIG. 5B is a flowchart of an exemplary method of providing a protection mechanism of the charging apparatus according to the present disclosure.

Please refer to FIG. 5B, which shows a flowchart of an exemplary method of providing a protection mechanism of the charging apparatus according to the present disclosure, and also refer to FIG. 2 to FIG. 5A. In the step (S100) to the step (S200), a protection mechanism of the charging apparatus 1 is provided. The method of providing the protection mechanism includes the following steps. First, the power of the power transmission path is detected for generating a power information signal (S300). A detection circuit 18 includes a plurality of detection units, such as a first voltage detection unit 182, a current detection unit 184, a frequency detection unit 186, a residual current detection unit 188, and a second voltage detection unit 190 for detecting power parameters of the power transmission path 12. The detection circuit 18 detects the power parameters of the power transmission path 12 to generate a power information signal Sp. The power information signal Sp includes at least the first voltage signal Sv1, the second voltage signal Sv2, the current signal Si, the frequency signal Sf, and the residual current signal Sir. Afterward, the first controller controls the power transmission path to be conducting or not conducting according to the power information signal (S320). The first controller 16A can determine whether an overvoltage (OV) event, an under voltage (UV) event, an over current (OC) event, an over frequency (OF) event, or an under frequency (UF) event of the power transmission path 12 occurs according to the first voltage signal Sv1, the second voltage signal Sv2, the current signal Si, and the frequency signal Sf, and determine whether a current leakage event of the power transmission path 12 (between a ground end N) occurs according to the residual current signal Sir. If the above-mentioned abnormalities do not occur, the first controller 16A controls the switch 20 to be turned on so that the power transmission path 12 is conducting. On the contrary, if any one of the abnormalities occurs, the first controller 16A controls the switch 20 to be turned off so that the power transmission path 12 is not conducting.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A charging apparatus for use with an electric vehicle, the charging apparatus comprising:
a power transmission path, one end of the power transmission path coupled to an AC power source through a first connection port, and the other end of the power transmission path coupled to the electric vehicle through a second connection port,
a switch disposed on the power transmission path,
a first controller coupled to the power transmission path and the switch,
a second controller coupled to the first controller and the AC power source, and
a communication unit coupled to the first controller and the second connection port,
wherein the second controller is configured to provide a first notification to the first controller when receiving a first request from the AC power source, and the first controller is configured to communicate with the electric vehicle through the communication unit and turn off the switch according to the first notification; the first controller is further configured to turn on the switch when receiving a first EV notification from the electric vehicle,
wherein when an operation is in a feeding mode or a charging mode, the switch is turned on, and a power flows from the AC power source to the electric vehicle, or the power flows from the electric vehicle to the AC power source; when the operation is in a standby mode, the switch is turned off, and the power transmission path is interrupted, and
wherein when the operation is changed from one of the charging mode and the feeding mode to the other, the first controller accordingly changes a signal format from one of a first signal and a second signal to the other to communicate with the electric vehicle, after the first controller communicates with the electric vehicle, the first controller controls the switch to turn off to enter the standby mode; in the standby mode and after the electric vehicle notifies the first controller, the first controller controls the switch to turn on.

2. The charging apparatus of claim 1, wherein the first controller is further configured to turn off the switch when the second controller receives a second request from the AC power source and correspondingly provides a second notification to the first controller, or when the first controller receives a second EV notification from the electric vehicle.

3. The charging apparatus of claim 2, wherein the first controller is configured to communicate with the electric vehicle through the communication unit using the second signal when receiving the first notification, and communicate with the electric vehicle through the communication unit using the first signal when receiving the second notification or the second EV notification.

4. The charging apparatus of claim 1, further comprising:
an auxiliary power circuit comprising a first conversion circuit and a second conversion circuit, wherein the first conversion circuit and/or the second conversion circuit are configured to convert a voltage of the power transmission path into an auxiliary power voltage.

5. The charging apparatus of claim 1, further comprising:
a detection circuit coupled to the power transmission path and the first controller, and configured to detect power parameters of the power transmission path to generate a power information signal,
wherein the first controller is configured to turn on or turn off the switch according to the power information signal.

6. The charging apparatus of claim 5, wherein the power transmission path comprises a first path formed between the first connection port and the switch, and a second path formed between the switch and the second connection port, the detection circuit comprising:
a first voltage detection unit configured to detect a voltage of the first path to provide a first voltage signal,
a frequency detection unit configured to detect an AC frequency of the power transmission path to provide a frequency signal,
a current detection unit configured to detect a current of the power transmission path to provide a current signal,
a residual current detection unit configured to detect a residual current to provide a residual current signal, and
a second voltage detection unit configured to detect a voltage of the second path to provide a second voltage signal,
wherein the power information signal comprises the first voltage signal, the frequency signal, the current signal, the residual current signal, and the second voltage signal.

7. The charging apparatus of claim 6, wherein the first controller is configured to determine whether an overvoltage event or an undervoltage event of the AC power source occurs according to the first voltage signal, and determine whether an overvoltage event or an undervoltage event of the electric vehicle occurs according to the second voltage signal; the first controller is configured to determine whether an overcurrent event of the power transmission path occurs according to the current signal, determine whether an over frequency event or an under frequency event of the power transmission path occurs according to the frequency signal, and determine whether a current leakage event of the power transmission path occurs according to the residual current signal; the first controller is further configured to turn off the switch when any one of the events occurs.

8. A method of operating a charging apparatus for use with an electric vehicle, the method comprising steps of:
   (a) receiving, by a second controller, a first request from a power management system,
   (b) notifying, by the second controller, a first controller when the second controller receives the first request so that the first controller correspondingly uses a second signal to communicate with an electric vehicle through a communication unit and controls a power transmission path to be not conducting, and
   (c) controlling, by the first controller, the power transmission path to be conducting when the first controller receives a first EV notification from the electric vehicle, and
   wherein when an operation is changed from one of a charging mode and a feeding mode to the other, the first controller accordingly changes a signal format from one of a first signal and a second signal to the other to communicate with the electric vehicle, after the first controller communicates with the electric vehicle, the first controller controls the power transmission path to be interrupted to enter the standby mode; in the standby mode and after the electric vehicle notifies the first controller, the first controller controls the power transmission path to be established.

9. The method of claim 8, further comprising a step of:
   (d1) notifying, by the second controller, the first controller when the second controller receives a second request from the power management system so that the first controller changes from the second signal to use the first signal to communicate with the electric vehicle through the communication unit and controls the power transmission path to be not conducting.

10. The method of claim 8, further comprising a step of:
    (d2) changing from the second signal to use the first signal, by the first controller, to communicate with the electric vehicle through the communication unit when the first controller receives a second EV notification from the electric vehicle, and controlling the power transmission path to be not conducting.

11. The method of claim 8, further comprising a step of:
    (e) converting, by a first conversion circuit and/or a second conversion circuit, AC power on the power transmission path into auxiliary power.

12. The method of claim 8, further comprising steps of:
    detecting power parameters of the power transmission path to generate a power information signal, and
    controlling, by the first controller, the power transmission path to be conducting or not conducting according to the power information signal.

13. The method of claim 12, further comprising a step of:
    controlling, by the first controller, the power transmission path to be not conducting when the first controller determines that any one of following events of AC power occurs according to the power information signal: an overvoltage event, an undervoltage event, an overcurrent event, an over frequency event, an under frequency event, and a current leakage event.

* * * * *